(12) United States Patent
Kwak et al.

(10) Patent No.: US 7,773,190 B2
(45) Date of Patent: Aug. 10, 2010

(54) LIQUID CRYSTAL DISPLAY PANEL AND FABRICATING METHOD THEREOF

(75) Inventors: Dong Yeung Kwak, Daegu (KR); Hyun Tae Kim, Seokjeok-myeon (KR)

(73) Assignee: LG. Display Co., Ltd., Seoul (KR)

( * ) Notice: Subject to any disclaimer, the term of this patent is extended or adjusted under 35 U.S.C. 154(b) by 906 days.

(21) Appl. No.: 11/480,182

(22) Filed: Jun. 30, 2006

(65) Prior Publication Data

US 2007/0002265 A1 Jan. 4, 2007

(30) Foreign Application Priority Data

Jun. 30, 2005 (KR) ............... 10-2005-0057986

(51) Int. Cl.
G02F 1/1339 (2006.01)
(52) U.S. Cl. ..................................... 349/157
(58) Field of Classification Search ............ 349/155, 349/157
See application file for complete search history.

(56) References Cited

U.S. PATENT DOCUMENTS

2001/0046024 A1  11/2001  Hiraishi et al.
2002/0075443 A1* 6/2002  Shimizu et al. ............ 349/155

FOREIGN PATENT DOCUMENTS

CN  1363851 A   8/2002
CN  1619371     5/2005

OTHER PUBLICATIONS

Notification of First Office Action for corresponding Chinese Patent Application Serial No. 2006100871775, dated Sep. 14, 2007.
Second Office Action issued in corresponding Chinese Patent Application No. 2006100871775; issued Mar. 14, 2008.

* cited by examiner

Primary Examiner—Jerry T Rahll
(74) Attorney, Agent, or Firm—Brinks Hofer Gilson & Lione

(57) ABSTRACT

Disclosed herein are a liquid crystal display panel and a fabricating method thereof for improving the reliability of cell gap maintenance and for preventing an aperture ratio reduction. In the liquid crystal display panel, a color filter array substrate includes a main column spacer and a sub column spacer. A thin film transistor array substrate is disposed in opposition to the color filter array substrate. The thin film transistor array substrate includes a plurality of films, including a top film in contact with the main column spacer and a depressed portion disposed below the sub column spacer.

13 Claims, 27 Drawing Sheets

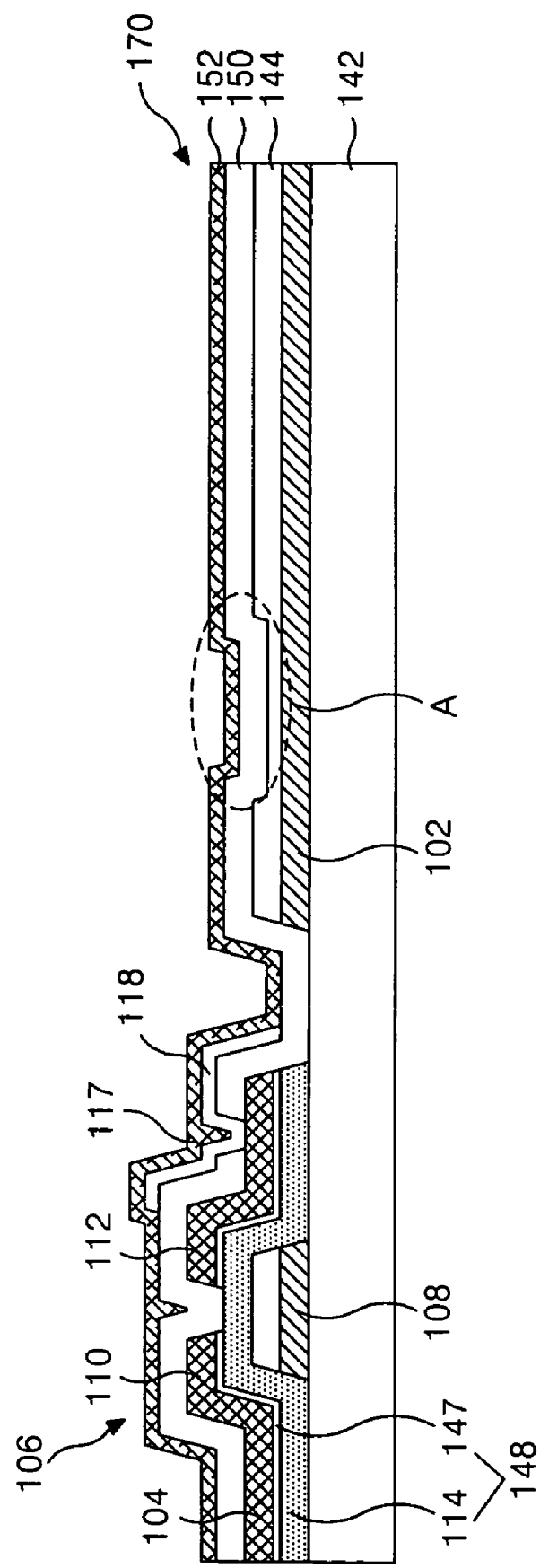

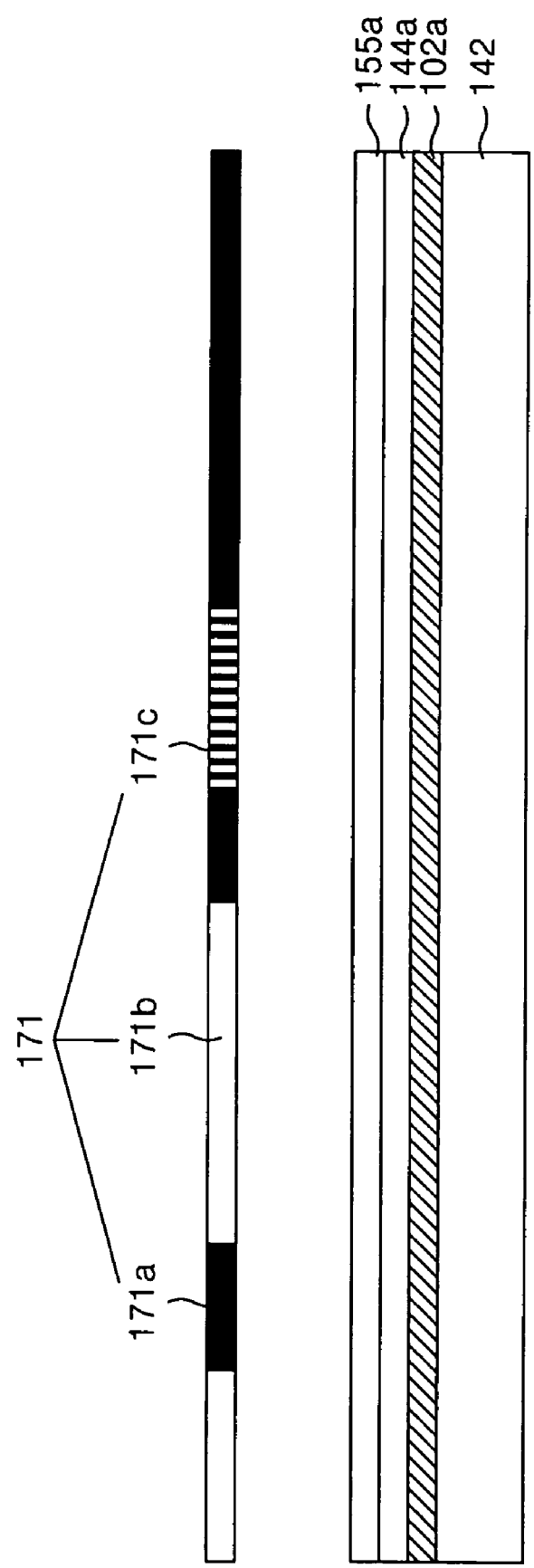

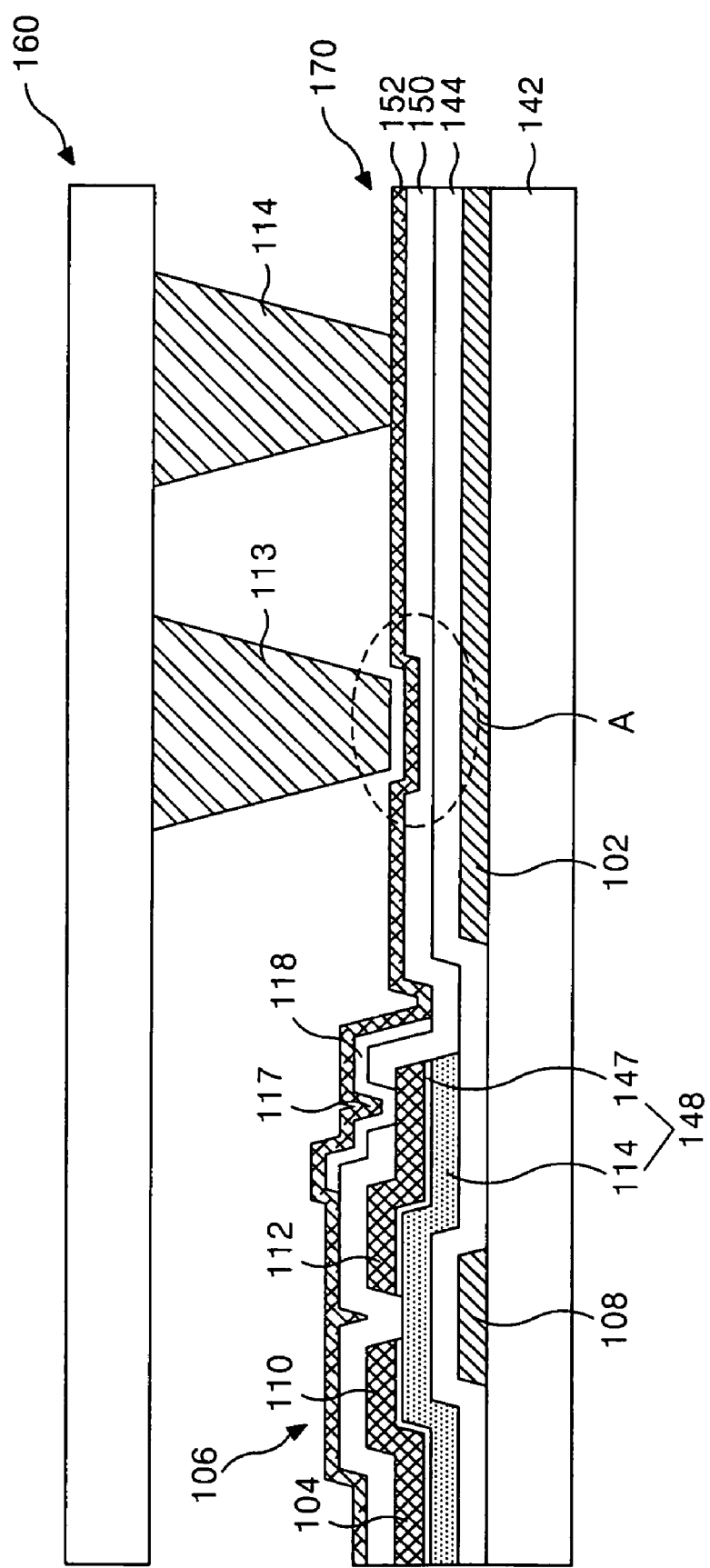

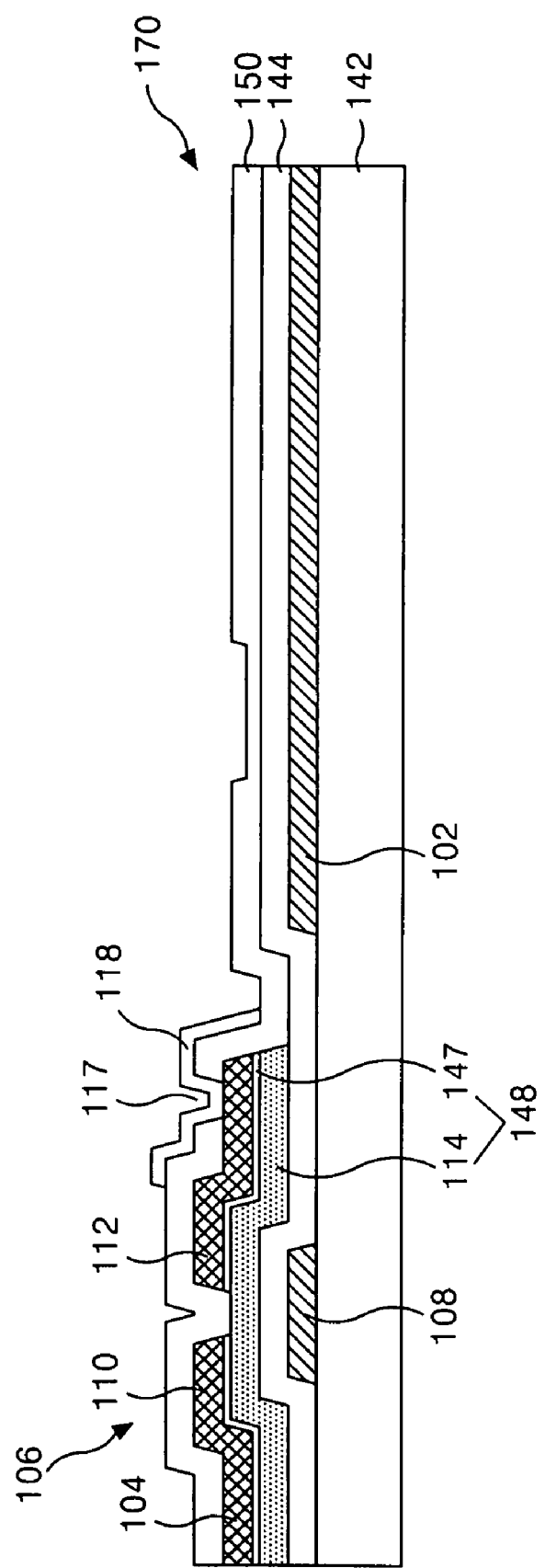

LIQUID CRYSTAL DISPLAY PANEL AND FABRICATING METHOD THEREOF

This application claims the benefit of Korean Patent Application No. P2005-0057986 filed in Korea on Jun. 30, 2005, which is hereby incorporated by reference.

TECHNICAL FIELD

The present disclosure relates to a liquid crystal display panel and to a fabricating method thereof that may improve the reliability of cell gap maintenance and prevent an aperture ratio reduction.

BACKGROUND

A liquid crystal display device controls light transmittance through a liquid crystal material using an electric field to thereby display a picture. Toward this end, the liquid crystal display device includes a liquid crystal display panel having liquid crystal cells arranged in a matrix, and a driving circuit for driving the liquid crystal display panel.

The liquid crystal display panel includes a thin film transistor array substrate and a color filter array substrate disposed in opposition to each other, a liquid crystal material injected between two substrates, and a spacer for maintaining a cell gap between two substrates.

The thin film transistor array substrate consists of gate lines, data lines, thin film transistors formed as switching devices for each intersection or crossing of the gate lines and the data lines, pixel electrodes formed for each liquid crystal cell and connected to the thin film transistor, and alignment films coated thereon. The gate lines and the data lines receive signals from the driving circuits via each pad portion. The thin film transistor applies a pixel signal fed to the data line to the pixel electrode in response to a scanning signal fed to the gate line.

The color filter array substrate consists of color filters formed for each liquid crystal cell, black matrices for dividing color filters and reflecting an external light, common electrodes for commonly applying reference voltages to the liquid crystal cells, and an alignment film coated thereon.

The liquid crystal display panel is fabricated by preparing the thin film array substrate and the color filter array substrate individually, joining them and then injecting a liquid crystal between them and sealing the structure.

FIG. 1 is a plan view illustrating a related art thin film transistor array substrate, and FIG. 2 is a sectional view of the thin film transistor array substrate taken along the line I-I' in FIG. 1.

Referring to FIG. 1 and FIG. 2, the thin film transistor array substrate includes a gate line 2 and a data line 4 provided on a lower substrate 42 in such a way as to cross each other with the gate insulating film 44 therebetween, a thin film transistor 6 provided at each crossing, and a pixel electrode 18 provided at a cell area having a crossing structure. Further, the thin film transistor array substrate includes a storage capacitor 20 (for the sake of convenience, a storage capacitor of an adjacent pixel area is shown in FIG. 1) provided at an overlapping portion of the pixel electrode 18 and the pre-stage gate line 2.

The thin film transistor 6 includes a gate electrode 8 connected to the gate line 2, a source electrode 10 connected to the data line 4, a drain electrode 12 connected to the pixel electrode 16, and an active layer 14 overlying the gate electrode 8 and defining a channel between the source electrode 10 and the drain electrode 12. The active layer 14 lies under the data line 4, the source electrode 10 and the drain electrode 12, and further includes a channel portion between the source electrode 10 and the drain electrode 12. An ohmic contact layer 47 for making an ohmic contact with the data line 4, the source electrode 10 and the drain electrode 12 is further formed on the active layer 14. Herein, the active layer 14 and the ohmic contact layer 47 are referred to as a semiconductor pattern 48.

The thin film transistor 6 allows a pixel voltage signal applied to the data line 4 to be charged into the pixel electrode 18 and kept in response to a gate signal applied to the gate line 2.

The pixel electrode 18 is connected, via a first contact hole 17 passing through a protective film 50, to the drain electrode 12 of the thin film transistor 6. The pixel electrode 18 generates a potential difference with respect to a common electrode provided at an upper substrate (not shown) by the charged pixel voltage signal. This potential difference rotates liquid crystals positioned between the thin film transistor array substrate and the upper substrate owing to their dielectric anisotropy and transmits light generated by a light source (not shown) toward the upper substrate.

The storage capacitor 20 is comprised of the pre-stage gate line 2, and the pixel electrode 18 overlapped with the gate line 2 with the gate insulating film 44 and the protective film 50 therebetween. The storage capacitor 20 allows a pixel voltage charged in the pixel electrode 18 to be stably maintained until the next pixel voltage is charged.

A column spacer 15 is positioned on a gate line 2 of a TFT array substrate in order to maintain the cell gap between the TFT array substrate and the color filter array substrate On the other hand, a dual column spacer to more reliably maintain the cell gap and prevent problems due to the liquid crystal expansion has been suggested.

FIG. 3 is a plan view showing a liquid crystal display panel having a dual column spacer (for the sake of convenience, the color filter array substrate is not shown in FIG. 3), and FIG. 4 is a sectional view of the liquid crystal display panel taken along the line II-II' in FIG. 3.

Referring to FIG. 3 and FIG. 4, the liquid crystal display device includes a main column spacer 24 contacted with a lower alignment film 52 at an area overlapped with the storage capacitor 20, and a sub column spacer 23 positioned at an area overlapped with the gate line 2.

The main column spacer 24 is disposed at a higher position than the sub column spacer 23, thereby playing a primary role to maintain the cell gap. To this end, the storage capacitor 20 positioned below the main column spacer 24 includes a step coverage generator 54 formed from a source/drain pattern and a semiconductor pattern, unlike in FIG. 1 and FIG. 2.

Generally, the sub column spacer 23 is positioned in such a way as to be spaced with the TFT array substrate 70 to play a role to prevent problems arising from expansion of the liquid crystal. If an outside pressure is applied, the sub column spacer 23 is contacted with the TFT array substrate 70, thereby assisting a cell gap maintenance function of the main column spacer 24.

But, in such a dual spacer structure, the function of the cell gap may not be reliably performed by the step coverage generator 54 inserted to form the step coverage between the main column spacer 24 and the sub column spacer 23.

In other words, if the main column spacer 24 positioned to correspond to the step coverage generator 54 is exposed to an external pressure, the position of the main column spacer 24 may deviate from a position area of the step coverage generator 54. Accordingly, the main column spacer 24 may not perform the cell gap maintenance function. Moreover, the main column spacer 24 may separate from the color filter array substrate.

Also, the step coverage generator 54 increases a line width of the gate line 2. Thus, an aperture ratio is reduced.

SUMMARY

The present disclosure describes a liquid crystal display panel and a fabricating method thereof that may improve the reliability of cell gap maintenance and prevent an aperture ratio reduction.

According to one aspect, the liquid crystal display panel includes a color filter array substrate with a main column spacer and a sub column spacer. A thin film transistor array substrate is disposed in opposition to the color filter array substrate. The thin film transistor array substrate includes a top film in contact with the main column spacer and a depressed portion disposed below the sub column spacer.

According to another aspect, the method of fabricating a liquid crystal display panel includes preparing a color filter array substrate provided with a main column spacer and a sub column spacer, and forming a thin film transistor array substrate in opposition to the color filter array substrate. The forming of the thin film transistor array substrate includes forming a depressed portion thereon. The thin film transistor array substrate is joined to the color filter array substrate with the main column spacer therebetween. The depressed portion is disposed below the sub column spacer when the thin film transistor array substrate is joined to the color filter array substrate.

BRIEF DESCRIPTION OF THE DRAWINGS

FIG. 7A to FIG. 7E are sectional views for explaining a method of fabricating the liquid crystal display panel according to the first embodiment step by step;

FIG. 8A to FIG. 8E are sectional views for specifically explaining the step shown in FIG. 7A;

FIG. 9 is a diagram showing a liquid crystal display panel according to a second embodiment;

FIG. 10A to FIG. 10E are sectional views for explaining a method of fabricating the liquid crystal display panel according to the second embodiment step by step;

DETAILED DESCRIPTION OF THE EMBODIMENTS

Hereinafter, the preferred embodiments will be described in detail with reference to FIG. 5 to FIG. 12.

Figure 5:
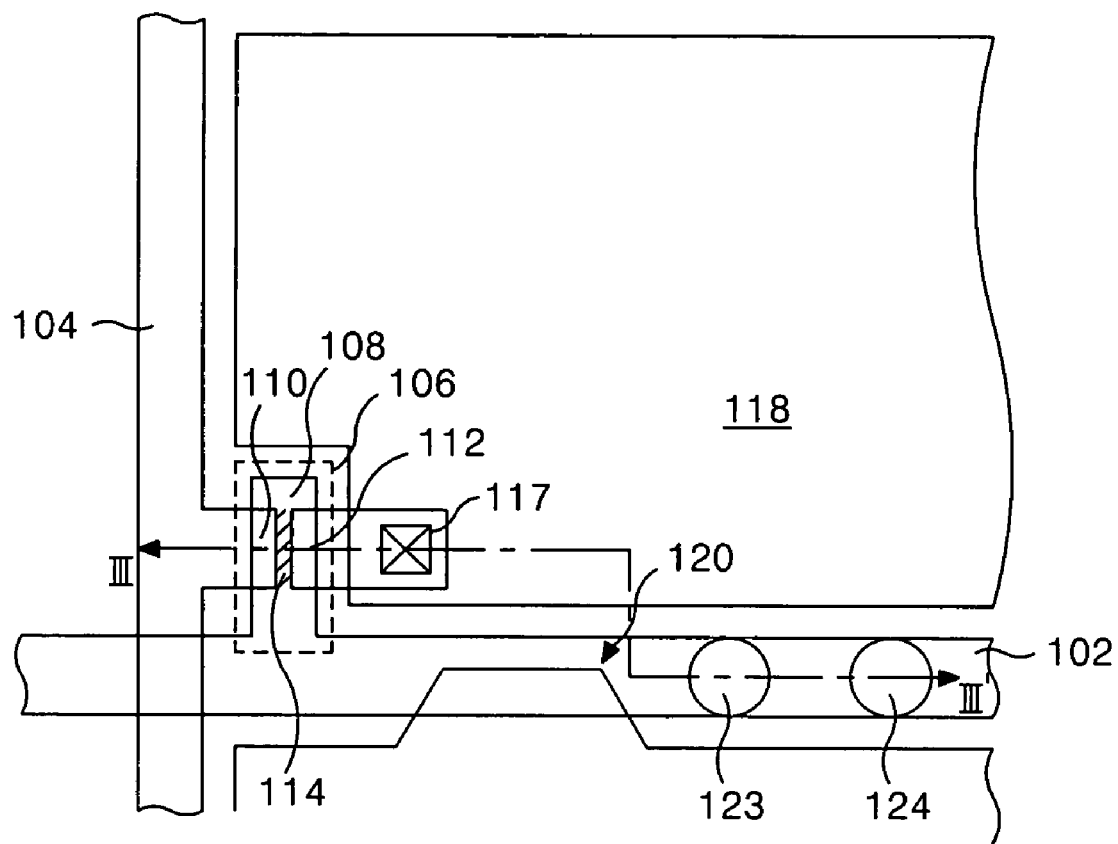
FIG. 5 is a diagram showing a liquid crystal display panel according to a first embodiment.
Figure 6:
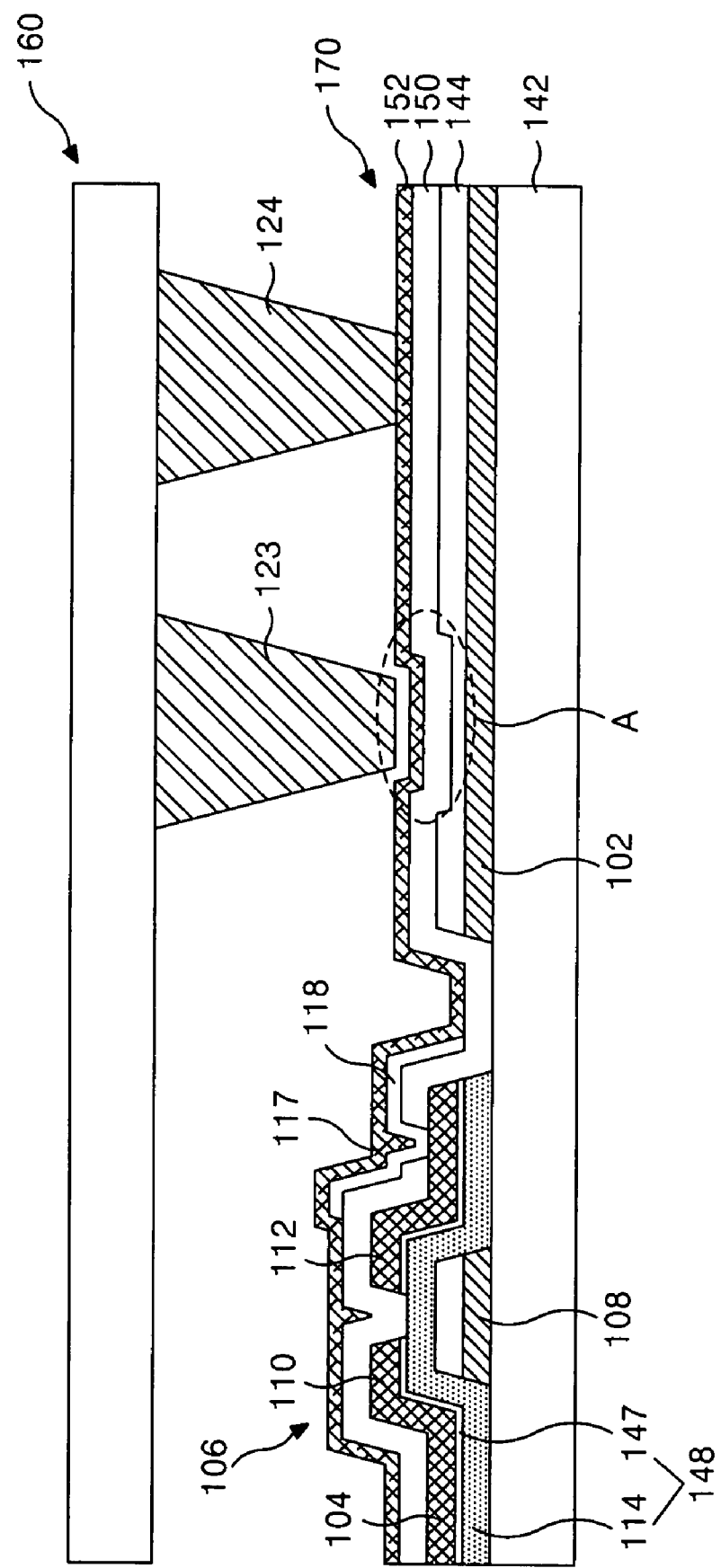
FIG. 6 is a sectional view of the liquid crystal display panel taken along the line III-III' in FIG. 5.

FIG. 5 is a plan view showing a liquid crystal display panel according to one embodiment (for the sake of convenience, the thin film transistor array substrate is shown), and FIG. 6 is a sectional view of the liquid crystal display panel taken along the section III-III' in FIG. 5;

Referring to FIG. 5 and FIG. 6, the liquid crystal display panel includes a color filter array substrate 160 and a thin film transistor array substrate 170 in opposition to each other with a main column spacer 124 and a sub column spacer 123 therebetween.

A thin film pattern including a black matrix and a color filter as well as the main column spacer 124 and the sub column spacer 123 are formed on the color filter array substrate 160.

The main column spacer 124 is contacted with the thin film transistor array substrate 170, thereby playing a primary role to maintain the cell gap. Generally, the sub column spacer 123 may be positioned in such a way as to maintain a designated distance with the thin film transistor array substrate 170, thereby preventing problems due to expansion of the liquid crystal. If an outside pressure is applied, the sub column spacer 123 contacts the thin film transistor array substrate 170, thereby assisting in maintaining the cell gap along with the main column spacer 124.

The thin film transistor array substrate 170 includes a gate line 102 and a data line 104 provided on a lower substrate 142 in such a way as to intersect or cross each other with a gate insulating pattern 144 therebetween, a thin film transistor 106 provided at each crossing, and a pixel electrode 118 provided at a cell area having a crossing structure. Further, the TFT array substrate 170 includes a storage capacitor 120 (for ease of explanation, a storage capacitor of an adjacent pixel area is shown in FIG. 5) provided at an overlapped portion between the pixel electrode 118 and the pre-stage gate line 102.

The TFT 106 includes a gate electrode 108 connected to the gate line 102, a source electrode 110 connected to the data line 104, a drain electrode 112 connected to the pixel electrode 118, and an active layer 114 overlying the gate electrode 108 and defining a channel between the source electrode 110 and the drain electrode 112. The active layer 114 is provided in such a way as to underlie the data line 104, the source electrode 110 and the drain electrode 112, and further includes a channel portion between the source electrode 110 and the drain electrode 112. On the active layer 114, an ohmic contact layer 147 for making an ohmic contact with the data line 104, the source electrode 110, the drain electrode 112. Herein, the active layer 114 and the ohmic contact layer 147 may be named as a semiconductor pattern 148.

The TFT 106 allows a pixel voltage signal applied to the data line 104 to be charged into the pixel electrode 118 and kept in response to a gate signal applied to the gate line 102.

The pixel electrode 118 is connected, via a contact hole 117 passing through a protective film 150, to the drain electrode 112 of the TFT 106. The pixel electrode 118 generates a potential difference with respect to a common electrode provided at an upper substrate (not shown) by the charged pixel voltage signal. This potential difference rotates liquid crystals positioned between the TFT array substrate and the upper substrate owing to their dielectric anisotropy and transmits light emitted from a light source (not shown) toward the upper substrate.

The storage capacitor 120 is comprised of the pre-stage gate line 102, and the pixel electrode 118 overlapped with the gate line 102 with the gate insulating film 144 and the protective film 150 therebetween. The storage capacitor 120 allows a pixel voltage charged in the pixel electrode 118 to be stably maintained until the next pixel voltage is charged.

The gate insulating pattern 144 is formed to overlie the gate line 102 and the gate electrode 108, and plays a role to form a designated depressed portion A in order to allow the sub column spacer 123 to be spaced a designated distance from the thin film transistor array substrate 170.

This will be described in detail.

In the present disclosure, the gate insulating pattern 144 may be formed by one mask process along with a gate pattern such as the gate electrode 108, etc., to have the same image as the gate pattern such as the gate electrode 108. Also, the gate insulating pattern 144 may be partially removed at an area below the sub column spacer 123, thereby playing a role to form the depressed portion A on the TFT array substrate 170. As a result, the sub column spacer 123 may not contact the TFT array substrate 170. In other words, the gate insulating pattern 144 may be formed to have a low height at an area below the sub column spacer 123. In addition, the protective film 150 and lower alignment film 152 each may be provided with a recessed region corresponding to the area below the sub column spacer 123.

Figure 1:
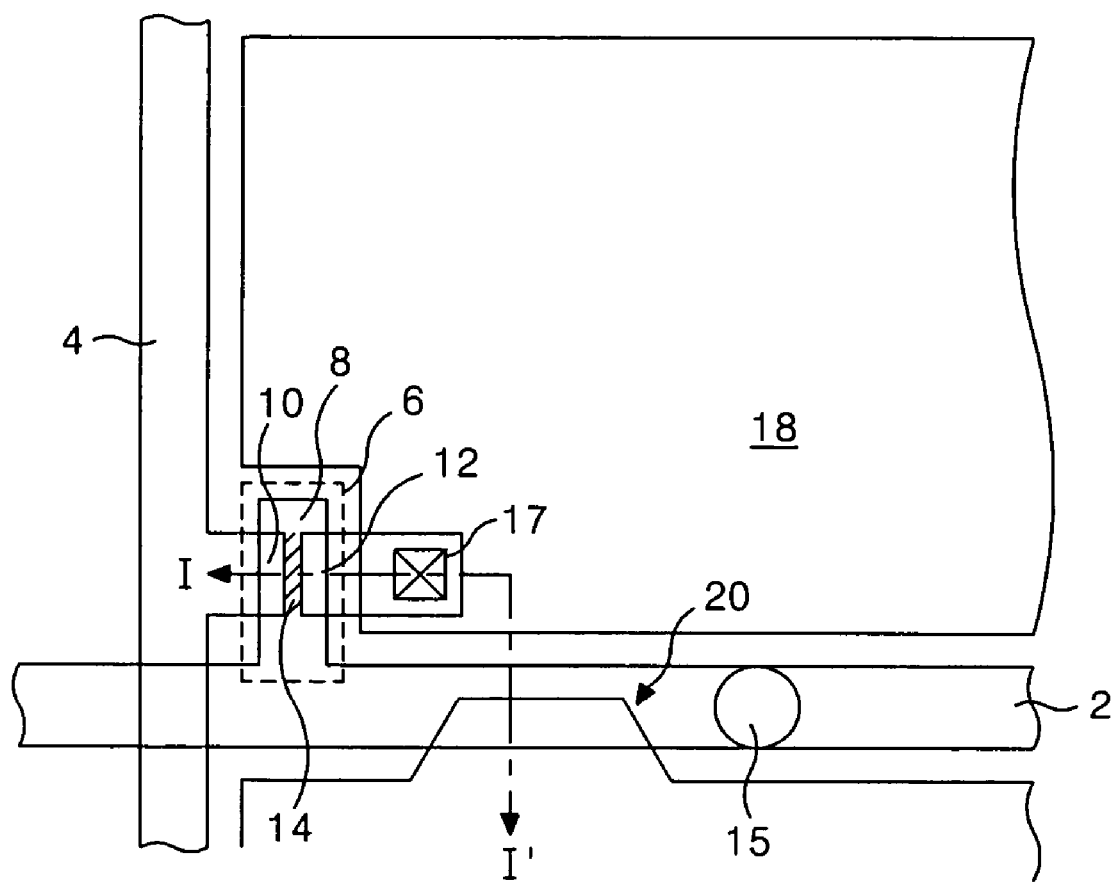
FIG. 1 is a plan view showing a portion of a related art thin film transistor array substrate.
Figure 2:
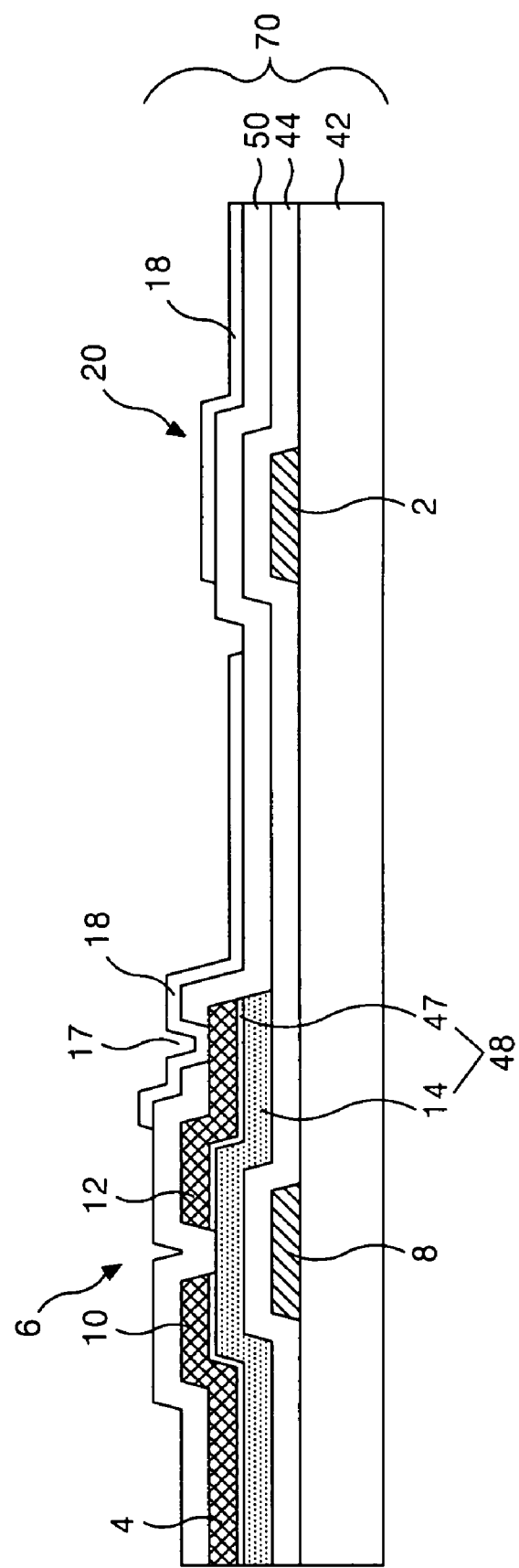
FIG. 2 is a sectional view of the thin film transistor array substrate taken along the line I-I' in FIG. 1.
Figure 3:
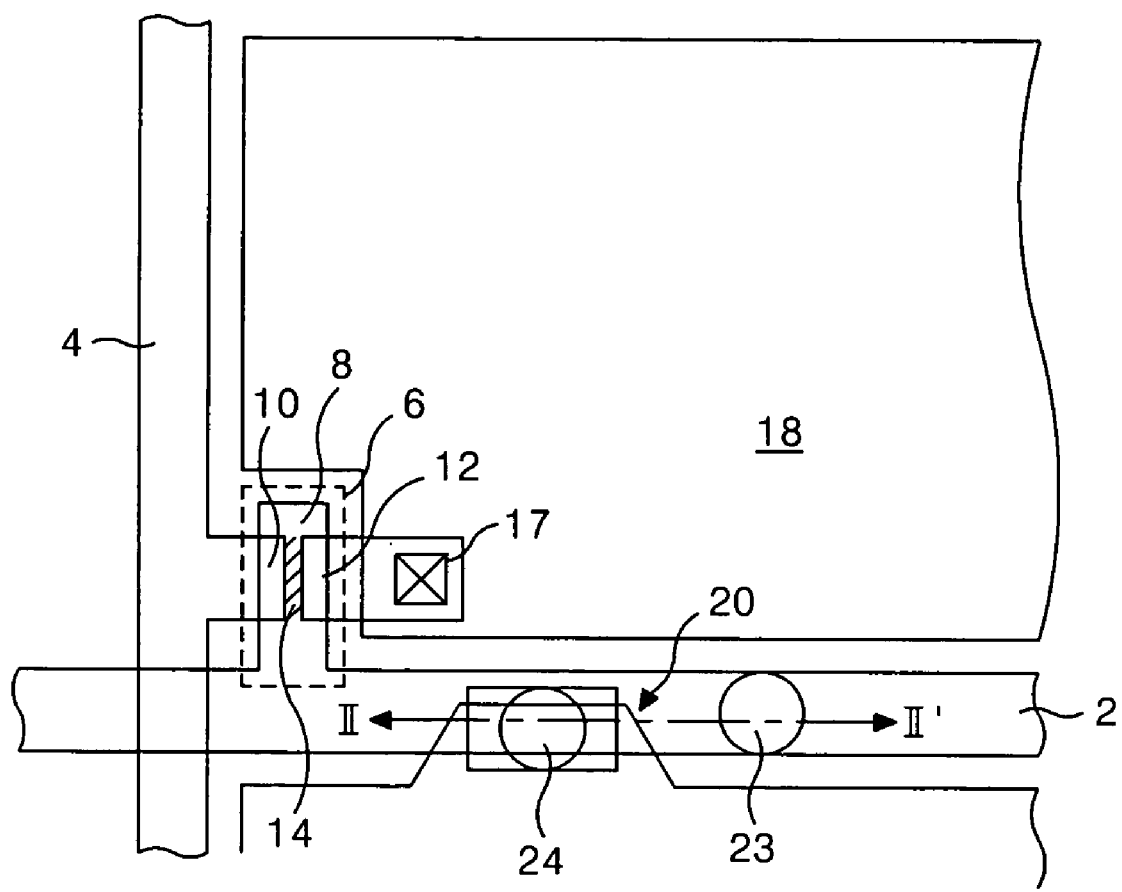
FIG. 3 is a plan view showing a liquid crystal display panel having a related art dual column spacer structure.
Figure 4:
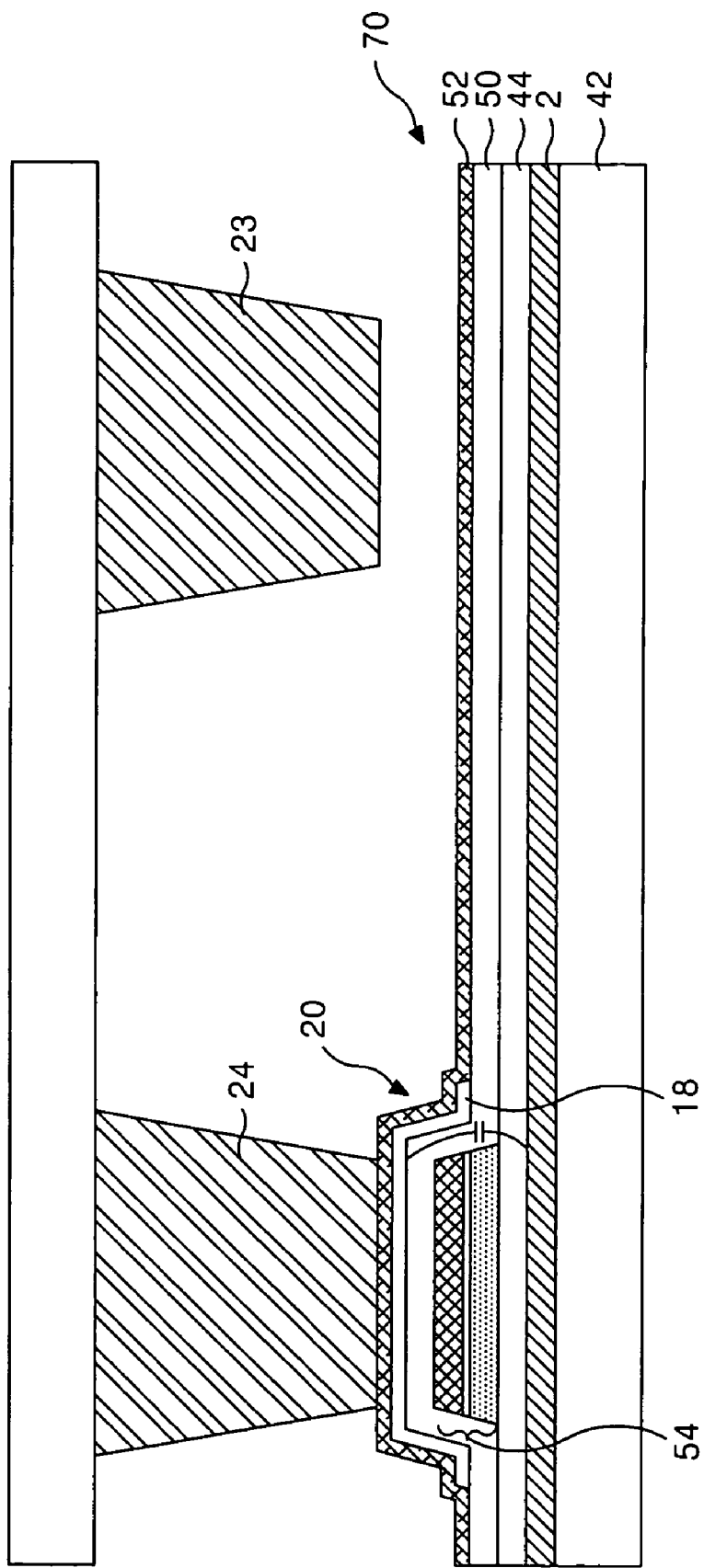
FIG. 4 is a sectional view of the thin film transistor array substrate taken along the line II-II' in FIG. 3.

Accordingly, it is not necessary to form the step coverage generator 54 for providing step coverage between the main column spacer 24 and the sub column spacer 23 on the storage capacitor 120 as in the related art shown in FIG. 4. In other words, the sub column spacer 123 may be separated from the TFT array substrate 170 by the depressed portion A, so that the main column spacer 124 can be positioned at an area overlying the storage capacitor 120 or the gate line 102 without the step coverage generator 54.

As a result, the cell gap maintenance function of the main column spacer 124 may be maintained and problems due to liquid crystal expansion may be prevented by the sub column spacer 123, that is, by the cell gap maintenance assistance and liquid crystal area margin securing provided by the sub column spacer 123. Also, the step coverage generator 54 of the related art may be removed. Thus, the line width of the gate line 102 may not be increased and an aperture ratio reduction may be prevented.

As described above, in the liquid crystal display panel, the depressed portion A is formed at an area below the sub column spacer 123 and thus the extra step coverage generator 54 for forming the main column spacer 124 is not required. As a result, the reliability of cell gap maintenance may be improved, and a reduction in the aperture ratio may be prevented.

Hereinafter, a method of fabricating the TFT array substrate of the liquid crystal display panel according to the first embodiment will be described in detail with reference to FIG. 7A to FIG. 8E.

Figure 7A:
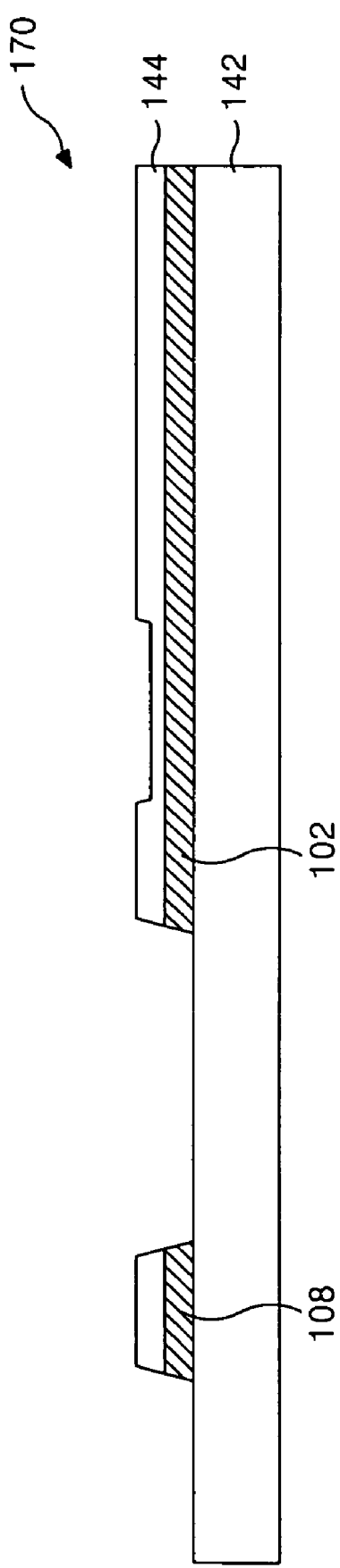

A gate metal layer and a gate insulating material are formed on the lower substrate 142 by a deposition technique such as sputtering. Then, the gate metal layer and the gate insulating material may be patterned by photolithography and etching using a mask, thereby forming a gate pattern including the gate line 102 and the gate electrode 108, and the gate insulating pattern 144 overlying the gate pattern as shown in FIG. 7A. Herein, a half tone mask or a slit mask, etc. may be used, so that it becomes possible to form the gate pattern and the gate insulating pattern using one mask.

This will be described in detail with reference to FIG. 8A to FIG. 8E.

First, after a gate metal layer 102a and a gate insulating material 144a are sequentially formed, then a photoresist 155a is coated on the lower substrate 142. Next, a slit mask 171 having a transmitting portion 171b, a shielding portion 171a and a slit portion 171c is aligned as shown in FIG. 8A.

Figure 8B:
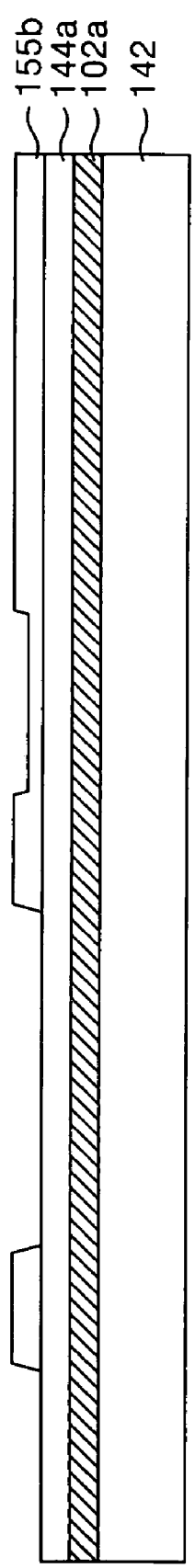

Then, the photoresist 155a corresponding to the transmitting portion 171b is removed, the photoresist 155a corresponding to the shielding portion 171a remains and the photoresist 155a having a relatively low height remains at an area corresponding to the slit portion 171c by carrying out the exposure and the development process. As a result, the photoresist pattern 155b remains at an area to be formed into the gate pattern and the gate insulating pattern 144, and the photoresist pattern 155b having a relatively low height remains at an area to be formed into the depressed portion A as shown in FIG. 8B.

Figure 8C:
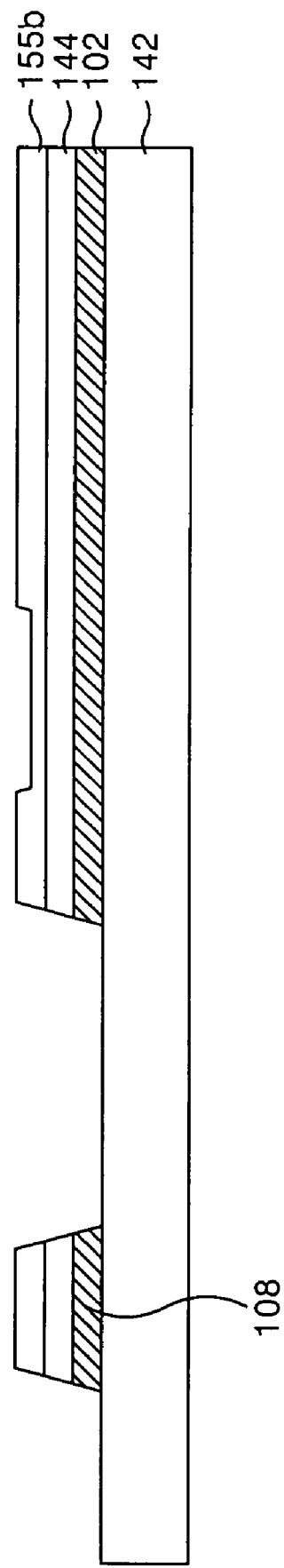
Figure 8D:
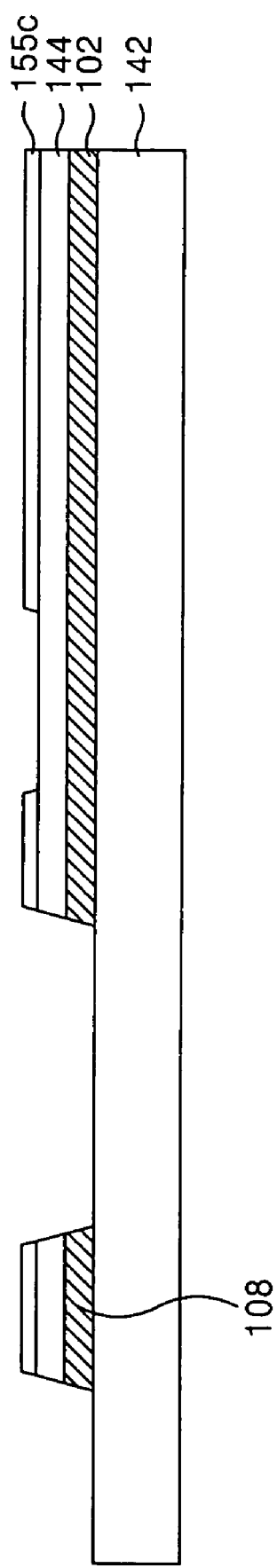
Figure 8E:
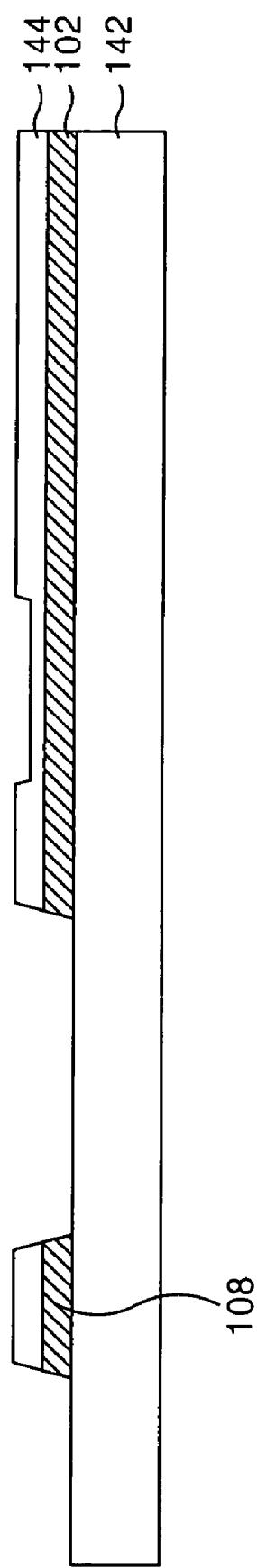

Next, an etching process using the photoresist pattern 155b may be carried out. Accordingly, the gate metal layer 102a and the gate insulating material 144a are patterned, thereby providing a gate pattern such as the gate electrode 108 and the gate line 102, and the gate insulating pattern 144 as shown in FIG. 8C. Next, the height of the photoresist pattern 155b may be further reduced by carrying out an ashing process, thereby providing a photoresist pattern 155c for exposing one portion of the gate insulating pattern 144, as shown in FIG. 8D. After the gate insulating pattern 144 is partially etched using the photoresist pattern 155c as a mask, the photoresist pattern 155c may be removed by a stripping process, thereby providing the gate insulating pattern 144 for forming the depressed portion A as shown in FIG. 8E. The gate insulating pattern 144 may be formed from an inorganic insulating material such as, for example, silicon oxide (SiOx) or silicon nitride (SiNx). Herein, an etching speed may be adjusted in such a way as to not directly expose the gate line, or the gate pattern may not be directly exposed by an $O_2$ plasma process, a silicon dioxide film process, etc. in order to prevent a short from being formed between the data line 104 and the gate line 102.

Figure 7B:
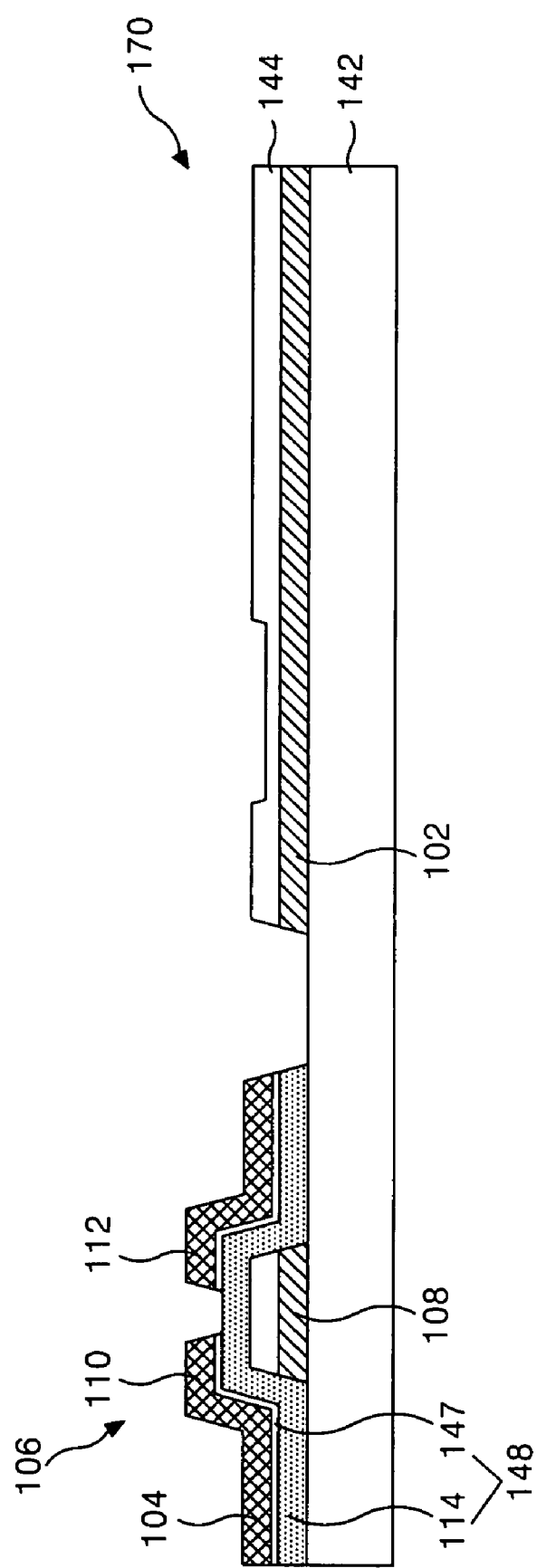

Next, referring to FIG. 7B, an amorphous silicon layer, an n+ amorphous silicon layer and a source/drain metal layer are sequentially provided on the lower substrate 142 provided with the gate pattern and the gate insulating pattern 144.

A photoresist pattern may be formed on the source/drain metal layer by photolithography using a mask. Herein, the mask may employ a diffractive exposure mask having a diffractive exposure portion at the channel portion of the thin film transistor, thereby allowing the photoresist pattern at the channel portion to have a lower height than other source/drain patterns.

Subsequently, the source/drain metal layer may be patterned by a wet etching process using the photoresist pattern to thereby provide source/drain patterns including the data line 104, the source electrode 110, the drain electrode 112 being integral to the source electrode 110.

Next, the amorphous silicon layer and the n+ amorphous silicon layer may be simultaneously patterned by a dry etching process using the same photoresist pattern to thereby provide the ohmic contact layer 147 and the active layer 114.

Further, the photoresist pattern having a relatively low height at the channel portion may be removed by an ashing process, and thereafter the source/drain pattern and the ohmic contact layer 147 at the channel portion may be etched by the dry etching process. Thus, the active layer 114 at the channel portion may be exposed to disconnect the source electrode 10 from the drain electrode 12. Then, the photoresist pattern left on the source/drain pattern group may be removed by a stripping process. Accordingly, the semiconductor pattern 148 including the active layer 114 and the ohmic contact layer 147, and the source/drain pattern may be formed as shown in FIG. 7B.

Herein, the source/drain metal may be selected from molybdenum (Mo), titanium (Ti), tantalum (Ta), copper (Cu), aluminum (Al), and alloys thereof, for example.

Figure 7C:
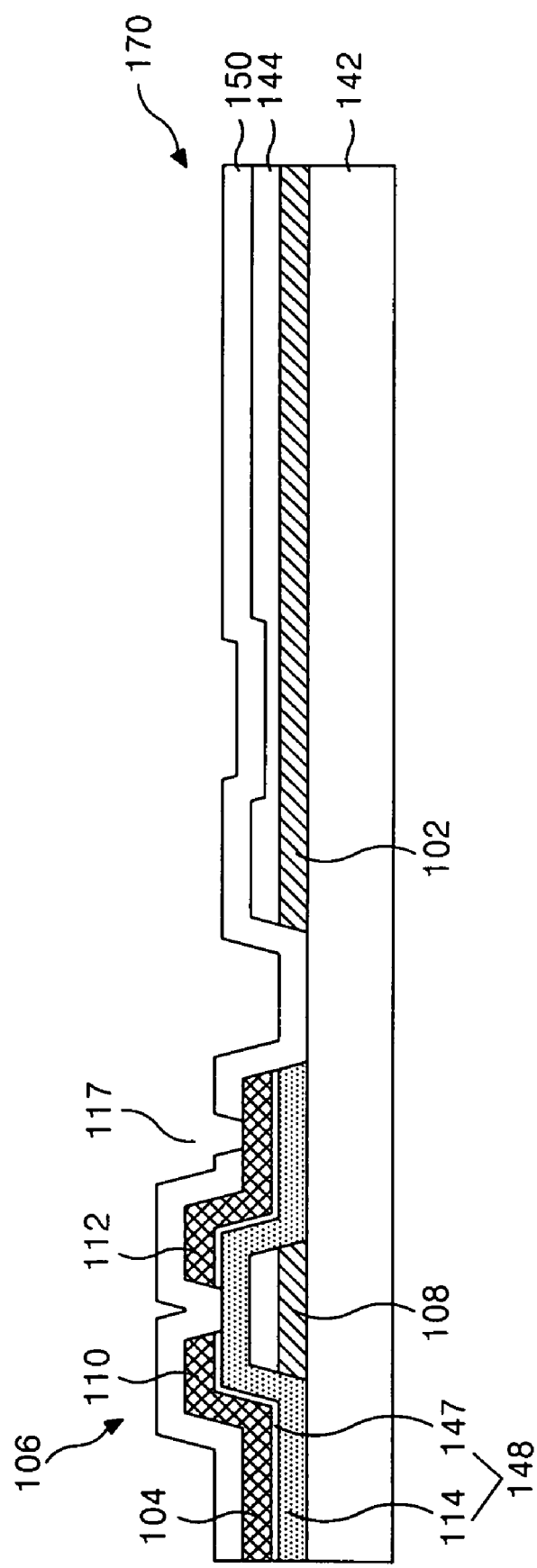
Figure 7D:
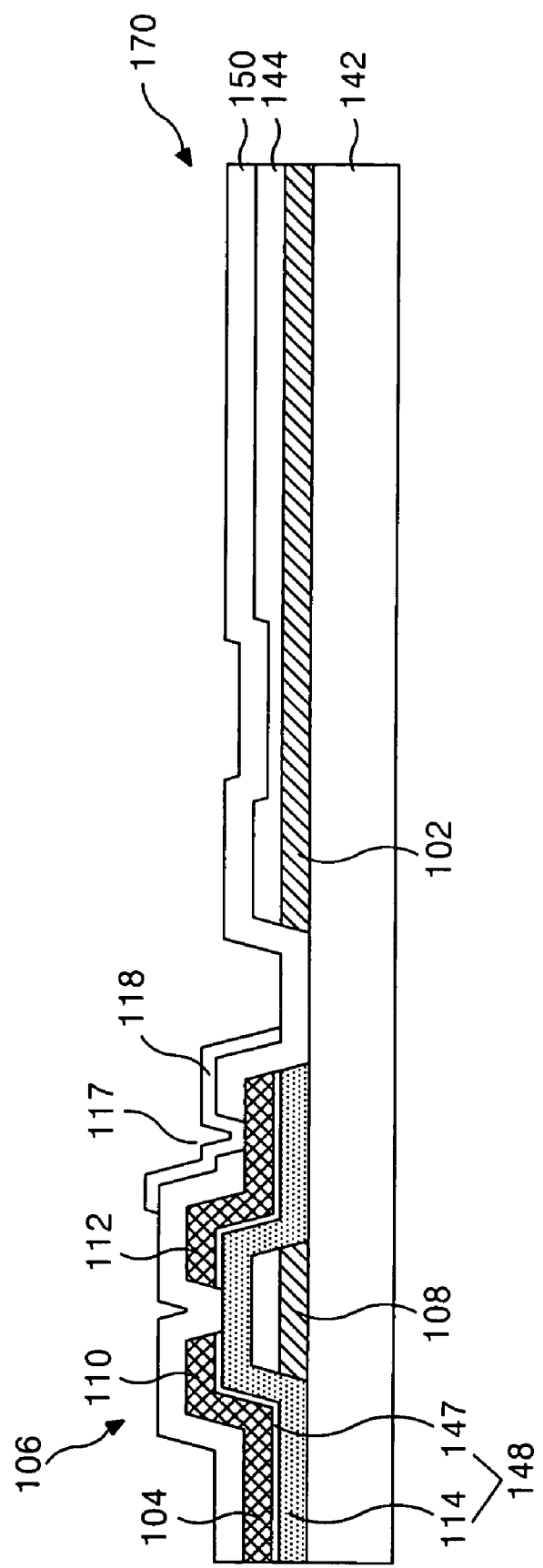

After the source/drain pattern is formed, then the protective film 150 may be deposited by a technique such as PECVD, etc. The protective film 150 may be patterned by photolithography and etching using a mask to provide a contact hole 117 for exposing the drain electrode 112 as shown in FIG. 7C. The protective film 150 may be made from an inorganic insulating material identical to the gate insulating pattern 144, or an organic insulating material such as an acrylic organic compound having a small dielectric constant, BCB (benzocyclobutene) or PFCB (perfluorocyclobutane), etc.

A transparent electrode material may be deposited onto the protective film 150 by a deposition technique such as sputtering, for example. Thereafter, the transparent electrode material may be patterned by photolithography and etching using a fourth mask to provide transparent electrode patterns, including the pixel electrode 118 shown in FIG. 7D. The pixel electrode 118 may be electrically connected, via the contact hole 117, to the drain electrode 112. The transparent electrode material may be selected from indium-tin-oxide (ITO), tin-oxide (TO), indium-zinc-oxide (IZO) or the like.

Thereafter, after an alignment material such as a polyimide, for example, is formed, an alignment process may be carried out, thereby providing the lower alignment film 152 as shown in FIG. 7E.

A step coverage area of the gate insulating pattern 144 in the TFT array substrate 170 is maintained to the lower alignment film 152, thereby providing the depressed portion A.

Next, if a separately manufactured color filter array substrate 160 and the TFT array substrate 170 are joined with each other, then the sub column spacer 123 may be positioned at an area overlying the depressed portion A and generally not in contact with the depressed portion A. If external pressure is applied, then the sub column spacer 123 may come into contact with the depressed portion A, to thereby play a role in the cell gap maintenance function of the main column spacer 124.

FIG. 9 is a sectional view showing a liquid crystal display panel according to a second embodiment.

The liquid crystal display panel shown in FIG. 9 has a protective film 150 which is formed to have a low height, in contrast to the liquid crystal display panel in which the gate insulating pattern 144 is formed to have a low height at an area below the sub column spacer 123 shown in FIG. 5 and FIG. 6. Other elements of the liquid crystal display panel shown in FIG. 9 are the same as those as the liquid crystal display panel shown in FIG. 5 and FIG. 6. Therefore, the same elements in FIG. 9 are given the same reference numerals as those in FIG. 5 and FIG. 6. Further, an explanation as to the same elements will be omitted.

Generally, an insulating material for forming the gate insulating film 144 and the protective film 150, etc. may be formed to have a higher height than other films, thereby playing a role to insulate and protect the thin films. Accordingly, the protective film 150 instead of the gate insulating pattern (the gate insulating material is not patterned in the second embodiment. Hereinafter, it is named as "gate insulating film", and the same reference numerals are given) may be formed to have a relatively low height, thereby providing the depressed portion A. Thus, the same operation and effect as the first embodiment may be achieved.

Hereinafter, a method of fabricating the liquid crystal display panel according to the second embodiment will be described in detail with reference to FIG. 10A to FIG. 11D.

Figure 10A:
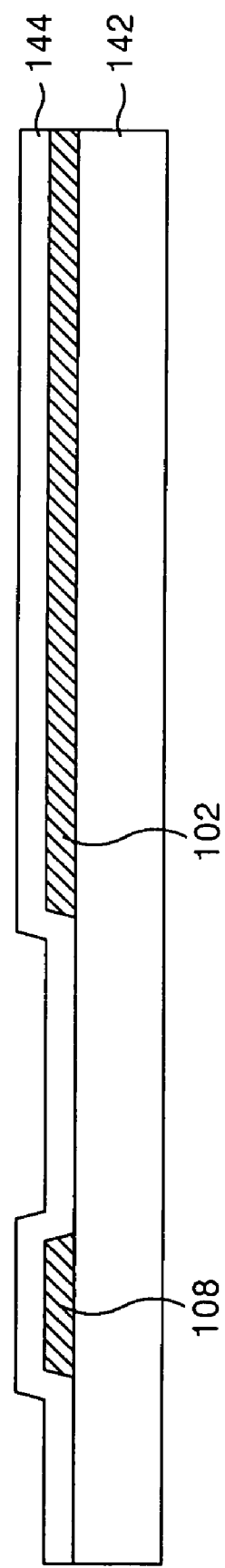

A gate metal layer may be formed on the lower substrate 42 by a deposition technique such as sputtering. Then, the gate metal layer may be patterned by photolithography and etching using a mask, thereby forming a gate pattern including the gate line 102 and the gate electrode 108 as shown in FIG. 10A.

Next, the gate insulating film 144 may be formed on the lower substrate 142 provided with the gate pattern.

An amorphous silicon layer, an n+ amorphous silicon layer and a source/drain metal layer may be sequentially provided on the lower substrate 142 provided with the gate pattern and the gate insulating film 144.

A photoresist pattern may be formed on the source/drain metal layer by photolithography using a mask. Herein, the mask may employ a diffractive exposure mask having a diffractive exposure portion at the channel portion of the thin film transistor, thereby allowing the photoresist pattern at the channel portion to have a lower height than other source/drain patterns.

Subsequently, the source/drain metal layer may be patterned by a wet etching process using the photoresist pattern to thereby provide source/drain patterns including the data line 104, the source electrode 110, and the drain electrode 112 being integral to the source electrode 110.

Next, the amorphous silicon layer and the n$^+$ amorphous silicon layer may be simultaneously patterned by a dry etching process using the same photoresist pattern to thereby provide the ohmic contact layer 147 and the active layer 114.

Figure 10B:
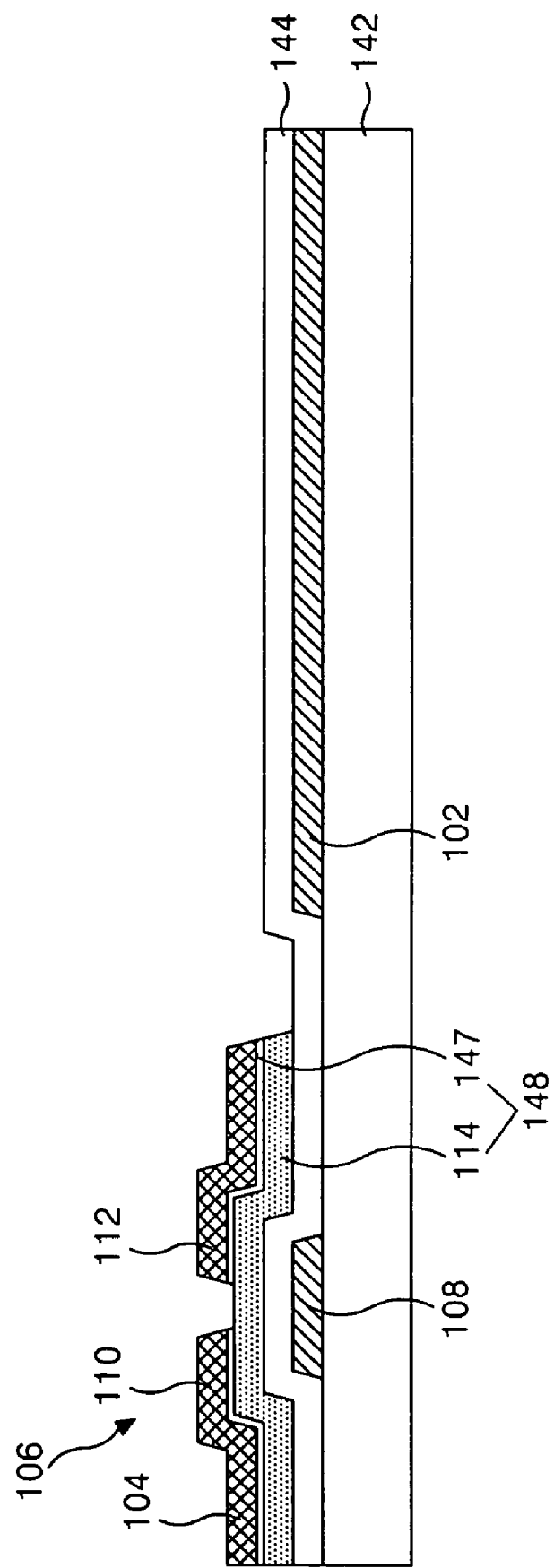

Further, the photoresist pattern having a relatively low height at the channel portion may be removed by an ashing process, and thereafter the source/drain pattern and the ohmic contact layer 147 at the channel portion may be etched using a dry etching process. Thus, the active layer 114 at the channel portion may be exposed to disconnect the source electrode 110 from the drain electrode 112. Then, the photoresist pattern left on the source/drain pattern group may be removed by the stripping process. Accordingly, the semiconductor pattern including the active layer 114 and the ohmic contact layer 147, and the source/drain pattern may be formed as shown in FIG. 10B.

Herein, the source/drain metal may be selected from molybdenum (Mo), titanium (Ti), tantalum (Ta), copper (Cu), aluminum (Al), or other metals and alloys thereof.

Figure 10C:
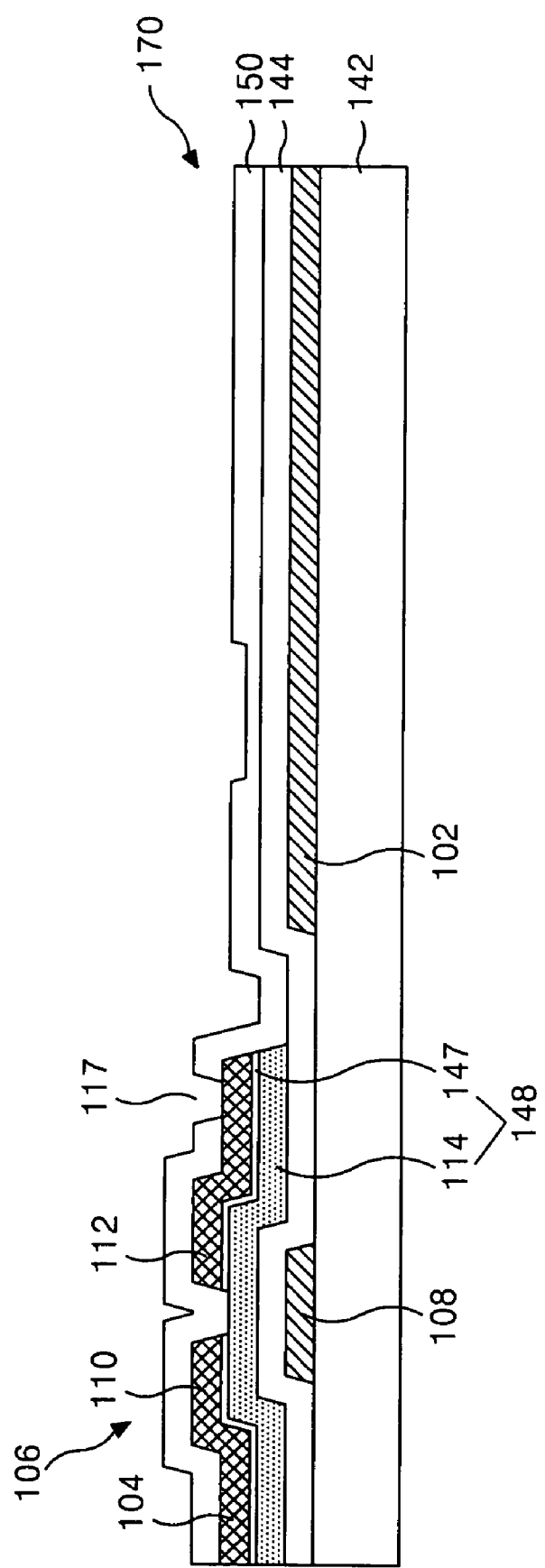

After the source/drain pattern is formed, then the protective film 150 may be deposited by a technique such as PECVD, for example. The protective film 150 may be patterned by photolithography and etching using a mask to provide a contact hole 116 for exposing the drain electrode 112 and to provide the protective film 150 having a relatively low height at the depressed portion A, as shown in FIG. 10C.

This will be described in detail with reference to FIG. 11A to FIG. 11D.

Figure 11A:
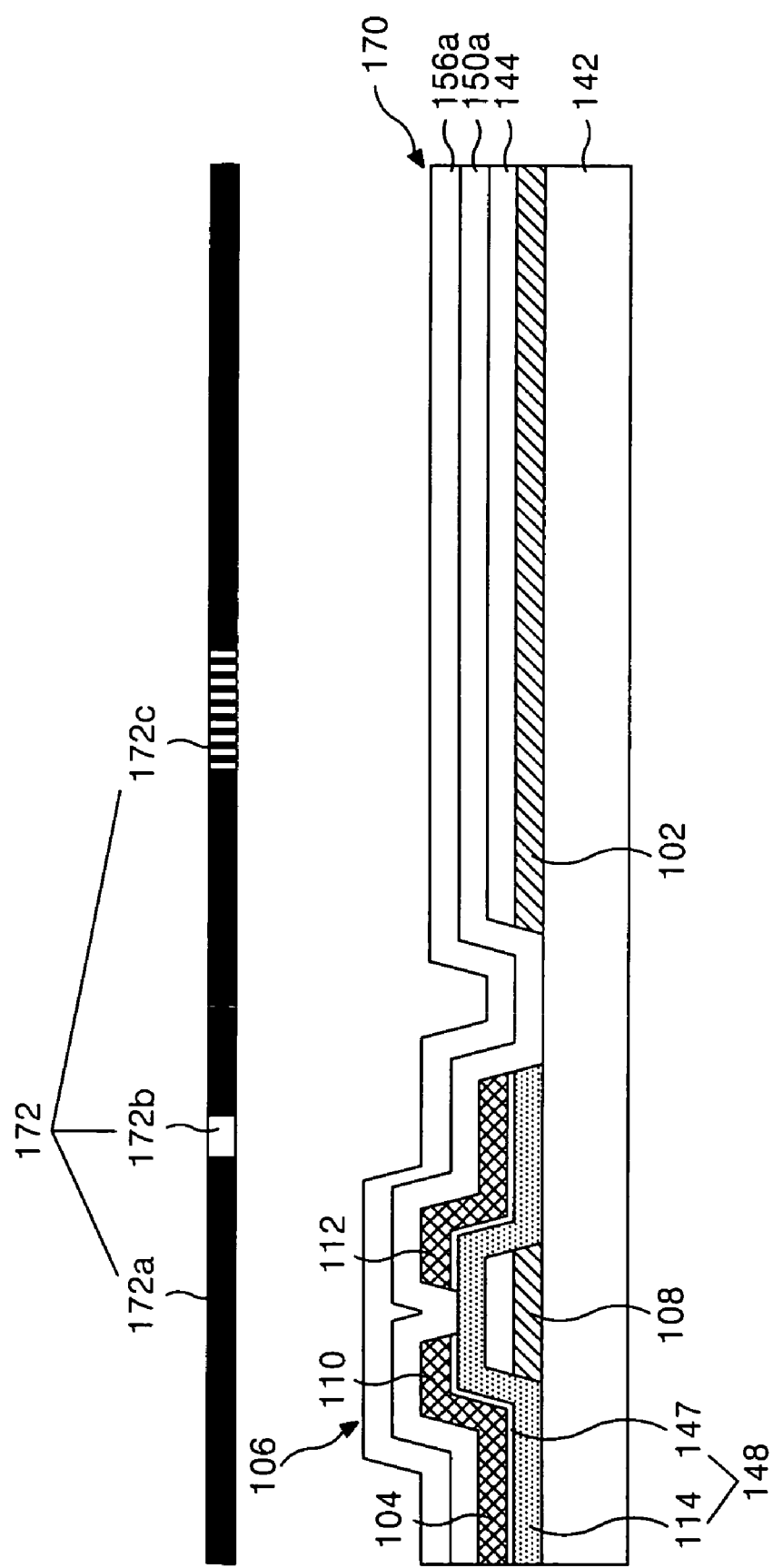
FIG. 11A to FIG. 11D are sectional views for specifically explaining the step shown in FIG. 10C.

First, an insulating material 150 and a photoresist 156a may be formed on the source/drain pattern. Next, a slit mask 172 having a transmitting portion 172b, a shielding portion 172a and a slit portion 172c may be aligned as shown in FIG. 11A.

Figure 11B:
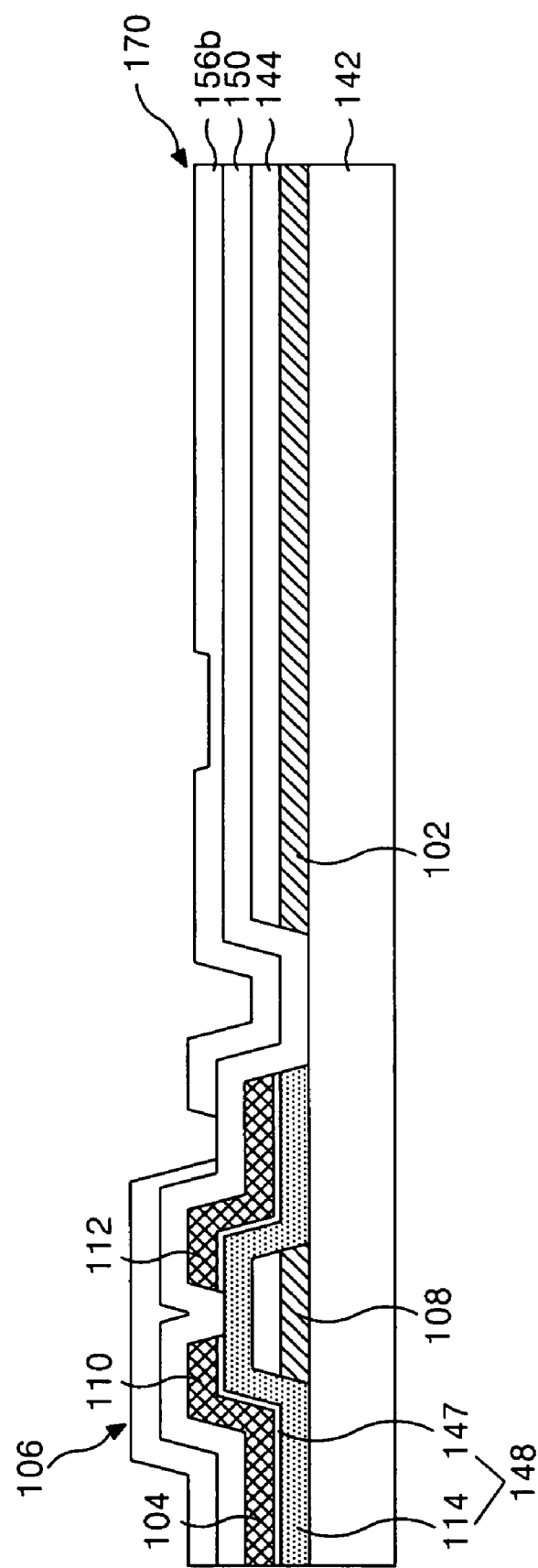

Then, the photoresist 156a corresponding to the transmitting portion 172b is removed, the photoresist 156a corresponding to the shielding portion 172a remains and the photoresist 156a having a relatively low height remains at an area corresponding to the slit portion 172c by carrying out the exposure and the development process. As a result, the photoresist pattern 156b remains as deposited at areas other than an area overlying the drain electrode 112, and photoresistan area to be formed into the depressed portion A, as shown in FIG. 11B.

Figure 11C:
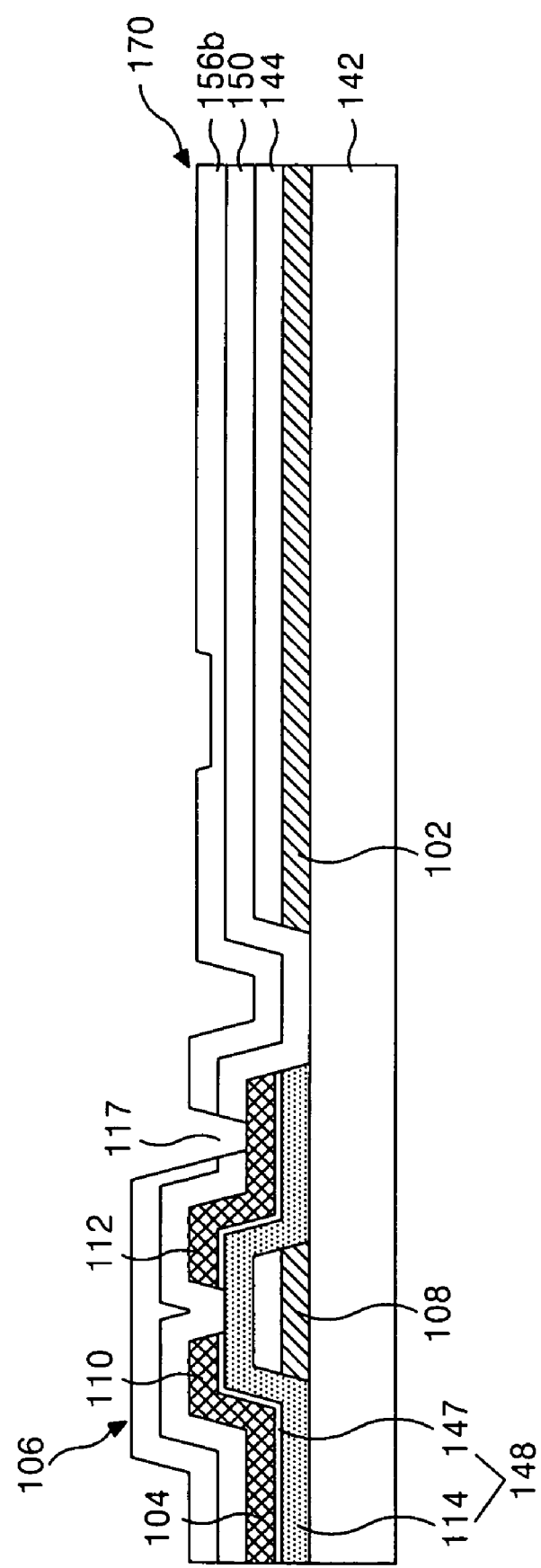
Figure 11D:
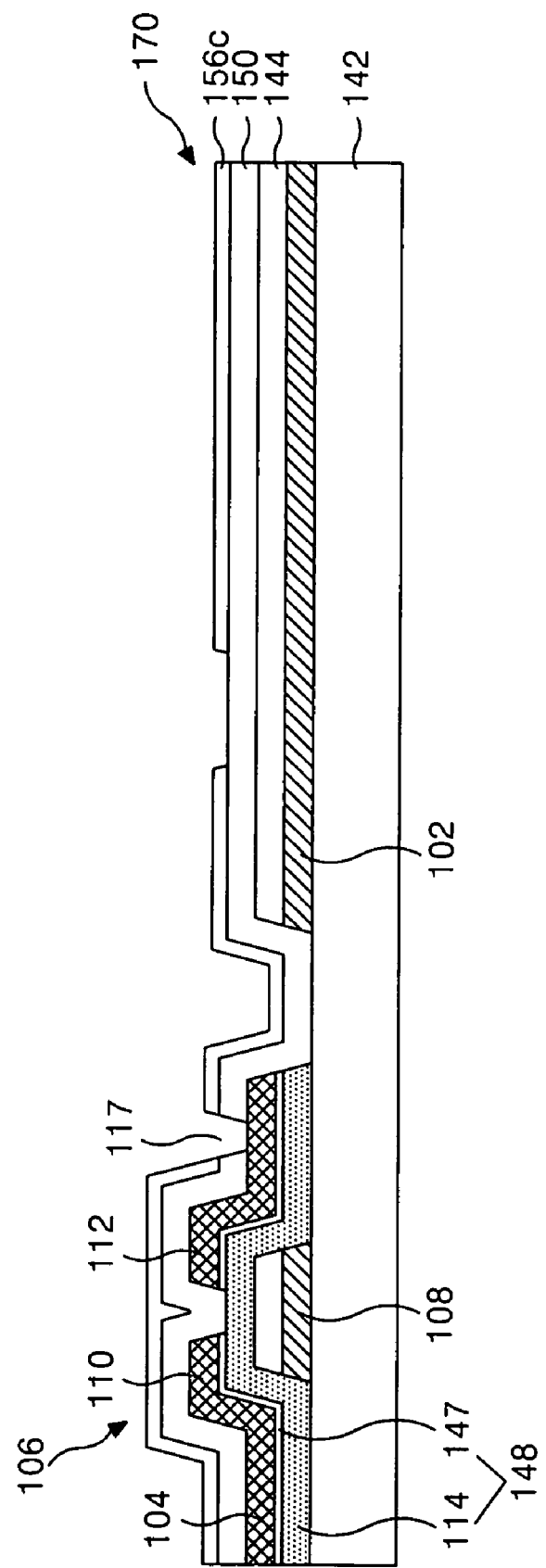

Next, an etching process using the photoresist pattern 156b may be carried out. Accordingly, the protective film 150 having a contact hole 117 for exposing the drain electrode 112 is formed, as shown in FIG. 11C. Next, the height may be lowered by carrying out an ashing process, thereby providing a photoresist pattern 156c for exposing one portion of the protective film 150 as shown in FIG. 11D. After the protective film 150 is partially etched using the photoresist pattern 156c as a mask, the photoresist pattern 156c may be removed by a stripping process, thereby providing the protective film 150 with a recessed region or step coverage for forming the depressed portion A as shown in FIG. 10C.

The protective film 150 may be made from an inorganic insulating material identical to the gate insulating film 144, or an organic insulating material such as an acrylic organic compound having a small dielectric constant, BCB (benzocyclobutene) or PFCB (perfluorocyclobutane), etc.

A transparent electrode material may be deposited onto the protective film 150 by a deposition technique such as sputtering, for example. Thereafter, the transparent electrode material may be patterned by photolithography and etching using a fourth mask to provide transparent electrode patterns, including the pixel electrode 118, as shown in FIG. 10D. The pixel electrode 118 is electrically connected, via a contact hole 117, to the drain electrode 112. The transparent electrode material may be selected from indium-tin-oxide (ITO), tin-oxide (TO), indium-zinc-oxide (IZO) or the like.

Figure 10E:
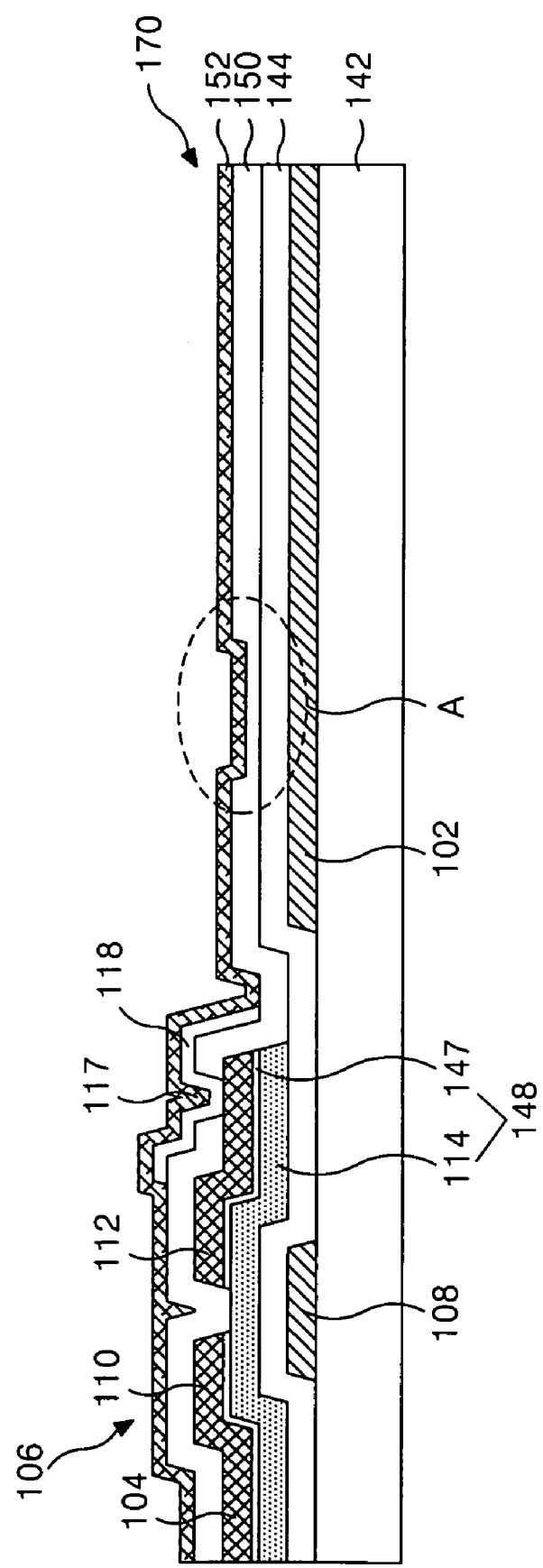

Thereafter, after an alignment material such as a polyimide, for example, is formed, an alignment process may be carried out, thereby providing the lower alignment film 152 as shown in FIG. 10E.

A step coverage area or recessed region of the protective film 150 in the thin film transistor array substrate 170 is maintained to the lower alignment film 152, thereby providing the depressed portion A.

Figure 12:
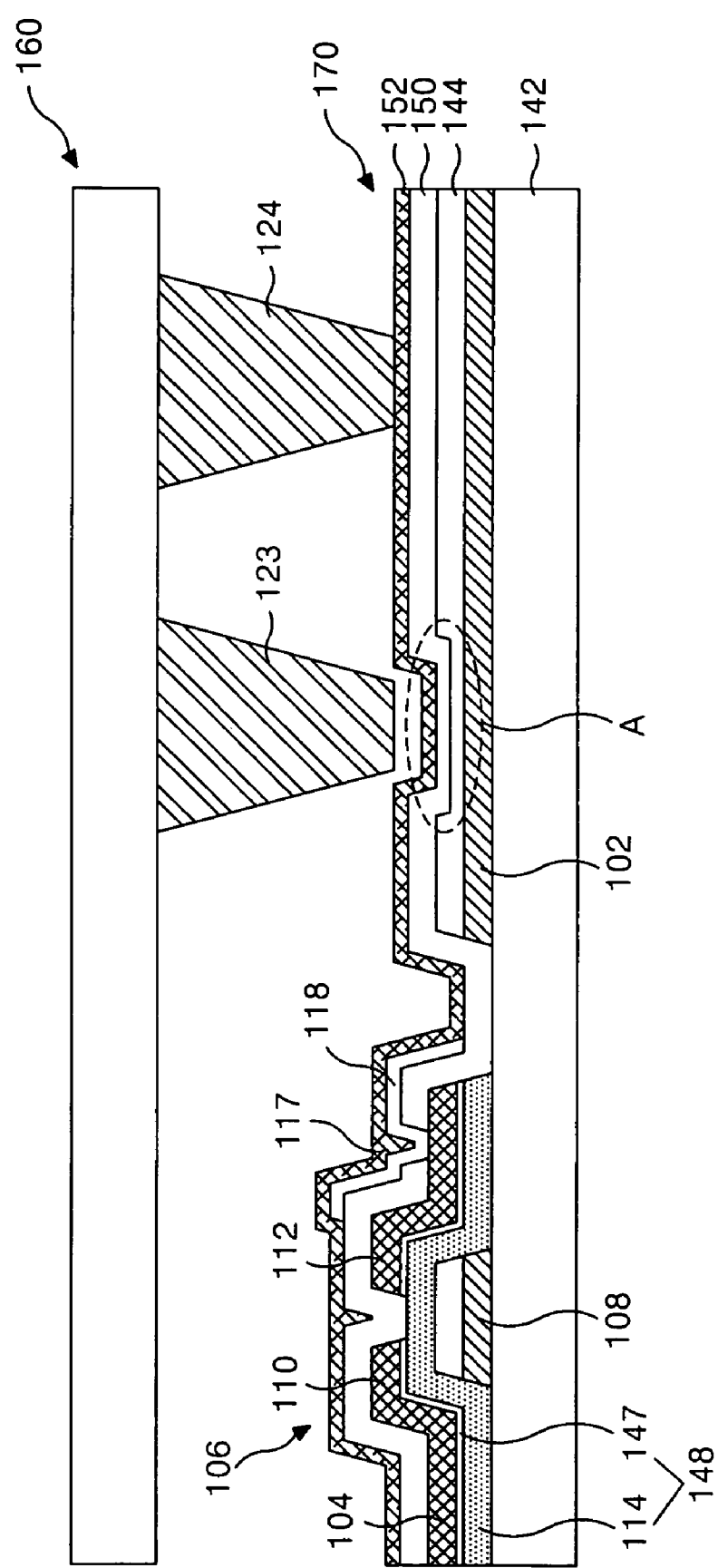
FIG. 12 is sectional view for explaining the liquid crystal display panel and a fabricating method thereof according to a third embodiment.

FIG. 12 is a diagram for explaining the liquid crystal display panel and a fabricating method thereof according to the third embodiment.

The liquid crystal display panel shown in FIG. 12 has a structure in which the gate insulating pattern 144 structure according to the first embodiment and the protective film 150 structure according to the second embodiment are used in combination.

The liquid crystal display panel shown in FIG. 12 has the same elements as the liquid crystal display panel shown in the first embodiment and the second embodiment, except that the gate insulating pattern 144 and the protective film 150 are formed to have a relatively low height in an area of the depressed portion A. Therefore, the same elements in FIG. 12 are given the same reference numerals as the first embodiment and the second embodiment. Further, an explanation of the same elements will be omitted.

In the present disclosure, the gate insulating pattern 144 is formed to have a relatively low height in an area of the depressed portion A by using the slit mask 171, and the protective film 150 is formed in such a manner to have a relatively low height at an area overlying an area having a low height of the gate insulating pattern 144 by using the slit mask 172, so that it becomes possible to adjust a depth of the depressed portion A to correspond to the sub column spacer 123.

As described above, the depressed portion is formed at an area below the sub column spacer, and therefore the extra step coverage generator for forming a positioning difference between the main column spacer and the sub column spacer is not required. As a result, the reliability of cell gap maintenance may be improved.

Furthermore, the step coverage generator of the related art may be removed. Thus, the line width of the gate line may not be increased, and it an aperture ratio reduction may be prevented.

Although the present invention has been explained by the embodiments shown in the drawings described above, it should be understood to the person of ordinary skill in the art that the invention is not limited to these embodiments and that various changes or modifications thereof are possible without departing from the spirit of the invention. Accordingly, the scope of the invention shall be determined only by the appended claims and their equivalents.

What is claimed is:

1. A liquid crystal display panel, comprising:
   a color filter array substrate provided with a main column spacer and a sub column spacer; and
   a thin film transistor array substrate disposed in opposition to the color filter array substrate,
   wherein the thin film transistor array substrate comprises:
   a top film in contact with the main column spacer and a depressed portion disposed under the sub column spacer;
   a gate line and a data line crossing each other with a gate insulating film disposed therebetween;
   a thin film transistor provided at each crossing of the gate line and the data line; and
   a protective film having a contact hole for exposing a drain electrode of the thin film transistor;
   wherein the depressed portion includes at least one of the protective film and the gate insulating film and at least one of the protective film and gate insulating film has a thinner thickness at an area overlapped with the sub column spacer than an area overlapped with the main column spacer.

2. The liquid crystal display panel as claimed in claim 1, wherein the thin film transistor array substrate further comprises:
   a pixel electrode connected, via the contact hole, to the drain electrode of the thin film transistor; and
   a lower alignment film formed on the pixel electrode and the protective film, the lower alignment film being the top film.

3. The liquid crystal display panel as claimed in claim 2, wherein at least one of the main column spacer and the sub column spacer overlies one of the gate line and the data line.

4. The liquid crystal display panel as claimed in claim 2, further comprising a storage capacitor including a pixel electrode overlying the gate line with the gate insulating film and the protective film therebetween.

5. The liquid crystal display panel as claimed in claim 4, wherein at least one of the main column spacer and the sub column spacer does not overlie the storage capacitor.

6. The liquid crystal display panel as claimed in claim 1, wherein the sub column spacer is inserted into the depressed portion when an outside pressure is applied.

7. A method of fabricating a liquid crystal display panel comprising:
   preparing a color filter array substrate provided with a main column spacer and a sub column spacer;
   forming a thin film transistor array substrate in opposition to the color filter array substrate, wherein the forming of the thin film transistor array substrate comprises forming a depressed portion thereon; and
   joining the thin film transistor array substrate to the color filter array substrate with the main column spacer therebetween, wherein the depressed portion is disposed below the sub column spacer, wherein forming a depressed portion on the thin film transistor array substrate includes:
forming a gate pattern including a gate line and gate electrode on a lower substrate;
forming a gate insulating film on the gate pattern;
forming a data line crossing the gate line, and a thin film transistor connected to the data line;
forming a protective film having a contact hole for exposing a drain electrode of the thin film transistor; and
forming a pixel electrode connected, via the contact hole, to the drain electrode of the thin film transistor,
wherein at least one of forming the gate insulating film and forming the protective film comprises forming the depressed portion; and
wherein at least one of the protective film and gate insulating film has a thinner thickness at an area overlapped with the sub column spacer than an area overlapped with the main column spacer.

8. The method as claimed in claim 7, wherein the sub column spacer is inserted into the depressed portion when an outside pressure is applied.

9. The method as claimed in claim 7, wherein forming the depressed portion includes:
sequentially forming a gate metal layer, a gate insulating material and a photoresist;
carrying out an exposure process and development process using a slit mask having a transmitting portion, a shielding portion and a slit portion on the photoresist, including exposing a gate insulating material and forming a photoresist pattern including a portion of a relatively low height;
patterning the gate insulating material and the gate metal layer using the photoresist pattern as a mask, thereby forming a gate insulating film overlying the gate pattern;
ashing the photoresist pattern and removing the portion of a relatively low height, thereby exposing a portion of the gate insulating film; and
partially removing the exposed gate insulating film by using a portion of the photoresist pattern left by the ashing process as a mask.

10. The method as claimed in claim 7, wherein forming the depressed portion includes:
sequentially forming an insulating material and a photoresist on a lower substrate provided with the data line and the thin film transistor array substrate;
carrying out an exposure process and development process using a slit mask having a transmitting portion, a shielding portion and a slit portion on the photoresist, including exposing the protective material and forming a photoresist pattern having a portion of a relatively low height;
patterning the gate insulating material by using the photoresist pattern as a mask, thereby forming a protective film having a contact hole for exposing the drain electrode;
ashing the photoresist pattern and removing the portion of a relatively low height, thereby exposing one portion of the protective film; and
partially removing the exposed protective film by using a portion of the photoresist pattern left by the ashing process as a mask.

11. The method as claimed in claim 7, wherein at least one of the main column spacer and the sub column spacer is disposed at an area overlying any one of the gate line and the data line.

12. The method as claimed in claim 7, further comprising:
forming a storage capacitor including a pixel electrode overlying the gate line with the gate insulating film and the protective film therebetween.

13. The method as claimed in claim 12, wherein at least one of the main column spacer and the sub column spacer does not overlie the storage capacitor.

* * * * *